(12) United States Patent
Taylor

(10) Patent No.: US 6,204,312 B1
(45) Date of Patent: *Mar. 20, 2001

(54) PROCESS FOR MANUFACTURING ORGANIC AND INORGANIC COMPOSITIONS, MOULDED FLAT OR EXTRUDED TO GIVE COMPLEX FORMATION, DIMENSIONAL STABILITY, ADDED STRENGTH, BIOLOGICAL RESISTANCE, USING NON TOXIC RESIN FORMULATIONS

(75) Inventor: Derek Taylor, Staffordshire (GB)

(73) Assignee: Advance Enterprises Ltd., Cannock (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/875,519

(22) PCT Filed: Jul. 5, 1996

(86) PCT No.: PCT/GB96/01604

§ 371 Date: Jul. 28, 1997

§ 102(e) Date: Jul. 28, 1997

(87) PCT Pub. No.: WO97/07166

PCT Pub. Date: Feb. 27, 1997

(30) Foreign Application Priority Data

Aug. 11, 1995 (GB) .................................................... 9516490

(51) Int. Cl.[7] .................................................... C08L 84/06
(52) U.S. Cl. .................................................................. 524/13
(58) Field of Search .................................................... 524/13

(56) References Cited

U.S. PATENT DOCUMENTS

| | | | |
|---|---|---|---|
| 3,936,412 | * 2/1976 | Rocholl | 524/401 |
| 3,954,701 | * 5/1976 | Schaffling | 523/138 |
| 4,062,825 | * 12/1977 | Watabe | 524/847 |
| 4,180,538 | 12/1979 | Morikawa et al. | |
| 4,233,080 | * 11/1980 | Koeppel | 524/5 |
| 4,375,521 | * 3/1983 | Arnold | 524/100 |
| 4,454,248 | * 6/1984 | Pollock | 521/53 |
| 4,551,517 | * 11/1985 | Herold | 528/66 |
| 4,742,112 | * 5/1988 | Brauer | 524/774 |
| 4,756,955 | * 7/1988 | Rias | 428/281 |
| 4,775,558 | * 10/1988 | Haas | 524/11 |
| 4,826,944 | * 5/1989 | Hoefer | 528/66 |
| 4,902,732 | * 2/1990 | Itoh | 523/435 |
| 4,933,373 | * 6/1990 | Moren | 521/170 |
| 4,935,488 | * 6/1990 | Omatsu | 528/272 |
| 5,284,938 | * 2/1994 | Dangayach | 523/458 |
| 5,336,703 | * 8/1994 | Homma | 523/435 |
| 5,610,215 | * 3/1997 | Nonweiler | 524/423 |
| 5,723,506 | * 3/1998 | Glorioso | 521/155 |
| 5,767,178 | * 6/1998 | Kolker | 524/13 |

FOREIGN PATENT DOCUMENTS

| | | |
|---|---|---|
| 2264083 | 8/1993 | (GB) . |
| 63-038433 | 2/1988 | (JP) . |
| 4178417 | 6/1992 | (JP) . |
| 4298516 | 10/1992 | (JP) . |

\* cited by examiner

Primary Examiner—Edward J. Cain
(74) Attorney, Agent, or Firm—Brown, Martin, Haller & McClain

(57) ABSTRACT

A rigid shaped product is produced from organic or inorganic solid particulate materials, preferably waste materials by mixing the solid particulate materials with a non-toxic composed of an aqueous dispersion of a blend of acrylic and polyurethane resin which forms a self-crosslinking composition resin material in a thermoplastic state to form a flowable mixture. The flowable mixture is then formed into a desired shape such as a flat panel or sheet, by molding, extrusion, or injection molding, and cured to thermoset the resin material and form a rigid, shaped product such as a construction board.

15 Claims, 7 Drawing Sheets

PROCESS FOR MANUFACTURING ORGANIC AND INORGANIC COMPOSITIONS, MOULDED FLAT OR EXTRUDED TO GIVE COMPLEX FORMATION, DIMENSIONAL STABILITY, ADDED STRENGTH, BIOLOGICAL RESISTANCE, USING NON TOXIC RESIN FORMULATIONS

FIELD OF INVENTION

The present invention relates to the non chemical treatment of lignocellulosics, as organic materials and inorganic materials to facilitate complex formation. More particularly the invention relates to the use of these organic and inorganic materials as compositions being pressed or extruded into finished products, giving dimensional stability, added strength, improving resistance to biological degradation, using non-toxic resin combinations. The organic materials can be in fractionated particles, none fractionated particles or fibre in homogeneous configuration.

DESCRIPTION OF THE PRIOR ART

Lignocellulosics/organic material/s posses many unique and desirable properties. it has several undesirable properties which have limited the use for many applications. It is known that the structure of the cell wall in its component parts individually and collectively determine the physical and chemical properties.

This can be seen regarding dimensional changes in respect to moisture content as the cell wall polymers contain hydroxyl and other oxygen groups and these attract moisture by hydrogen bonding. With the moisture swelling the cell wall the material expands untill the cell wall is saturated with water, water going further than this point is free water in a void structure and does not contribute to further expansion. The process is reversible by losing moisture.

Because organic/lignocellulosic materials can be degraded biologically as organisms, can recognise the polysaccharides in the cell wall and having very specific enzyme systems capable of hydrolizing theses polymers into digestible units. High molecular weight cellulose is responsible for strength in organic materials. The strength is lost as this polymer takes on further biological degradation and dehydration reactions.

Because dimensional instability and strength along with biological degradation can be said to be chemical in nature, it is possible to improve these undesirable properties by changing the basic chemistry of the cell wall polymers by encapsulation and complex formation leading to chemical bonding. Completing reaction by complex formation, encapsulation and chemical bonding precasts the cellulose and hemicellulose components as an example. The highly specific enzymatic reactions cannot take place because the moisture, oxygen and chemical configuration by encapsulation and chemical bonding has substantially altered the substrate. This chemical reaction in bonding reacts the cell wall polymers with resin reacting chemicals and reduces the tendency to swell to an absolute minimum, and this when subjected to change in moisture because the lignocellulosic in organic materials is chemically swollen and reaction encapsulation by application of heat.

The hydroxyl groups therefore play a significant role in the organic and inorganic applications of the resins to produce the end product.

Organic materials as lignocellulosics and inorganic materials fractionated and blended with themselves and together.

Resin systems greatly improves dimensional stability and bond strength and is resistant to biological attack and is according to the invention, made in the absence of any co solvent or added catalyst and does not use combinations of urea formaldehyde resins or phenol resins and made in a simple way.

Partially dry or dried organic or inorganic materials or combinations of both are fractioned or unfractioned and blended with non toxic resin systems to give complete envelope and complex formation. The material is then dried, pressed, moulded, or extruded into finished items in a short period of time.

It cannot be stressed enough that the invention deals with aqueous resin application in liquid, solid dispersion and then dried.

Moulded Compositions—Organic and Inorganic

DESCRIPTION OF THE INVENTION

It is an object of the present invention to provide a new and improved method of using organic or inorganic waste materials which would otherwise be discarded.

According to the present invention, a method of producing a shaped end product from organic or inorganic waste materials is provided, which comprises introducing raw waste material particles into a mixing chamber, introducing a non-toxic resin material into the mixing chamber at a first temperature at which the resin material is thermoplastic, mixing the waste material and resin material together to form a flowable mixture, forming the flowable mixture into a predetermined shape, and curing the shaped mixture to thermoset the resin material and form a rigid, shaped end product.

This method allows inorganic and organic waste materials, either alone or in combination, to be formed into a moldable composition and to be used for many possible applications, particularly as a substitute for wood or for natural building or construction materials. There has been a longstanding, worldwide need to reduce usage of natural wood, and this method allows otherwise unusable waste materials to provide a wood substitute.

Suitable organic and inorganic materials, which may be used in combinations or separately, for use as the starting waste material in this method are listed below.

Organic Materials
 1) Hard Wood Dust
 2) Rubber Wood
 3) Softwood Flakes
 4) Hemp Fibre Dust
 5) Semphire
 6) Salicornia
 7) Bagasse
 8) Rice Husk
 9) Ground rice
 10) Palm-Fronze-Bunch, Trunk
 11) Paper 12) (1–9) As flour
13) Cloth
Used singly or in combinations.
Inorganic Materials
1) Slate Dust
2) Ceramic Dust
3) Pottery Waste
4) Dune Sand
5) Sea Shore Sand
6) Quarry Waste
7) Limestone The above being used as single materials or in combination and in combination with other materials.

Some of these basically comprise reconstituted wood, whereby wood residues are applied into a homogeneous mass to form a solid product, which have many of the properties of wood.

Chipboard is an example of such a product, however, chipboard and similar products are only available in the form of flat boards and the manufacturing process by which such products are obtained does not lend itself to the production of shaped sections or mouldings which are required for many architectural features in the construction of buildings for example. Such shaped components, which were traditionally formed from solid wood by appropriate machining operations, are often replaced by equivalent components made from metal or from plastic materials, but such materials are generally environmentally disadvantageous with regard to such matters as the energy expanded in the production of the raw materials, and often the hazardous nature of the chemicals required for processing.

On the other hand the organic and inorganic materials listed offer vast quantities or relatively innocuous waste vegetable matter arising from numerous industrial processes—similar occurs with inorganic material as listed. All of these materials having little or no commercial use at the moment.

The object of this invention is to provide a novel mouldable composition in organic and inorganic materials, polymeric in nature, homogeneous in finish for use as a substitute or combination composites of low toxicity, low hazard, high stability and inner bond strength.

According to a first aspect of the invention we provide a moulding composition, homogeneous in structure comprising of organic or inorganic fractionated materials singularly or in combination, coated with a fully reacted high molecular weight polyurethane resin. Resin modified with hydrophilic groups such that the coating is not penetrative absorbent to the particles of the fraction.

From the outset it should be noted that the resin compositions exclude totally the use of:

1) UF Resins
2) FMUF Resins
3) MUF Resins
4) Isocyanate Resins
5) Phenolic resins—Resoles or Novolaks According to the second aspect of the invention we provide mouldable compositions homogeneous in structure from the following types of resin for both organic and inorganic materials.

1) Polyurethane combinations
2) Acrylic combinations
3) Hybrid combinations
4) Compositions of resins synthesised from palm oil source.
5) Compositions of resins synthesised from salicornia oil source.
6) Compositions of resins synthesised from dextrose mono hydrates According to the Third Aspect of the Invention The above (1–6) giving complex formation of the substrate homogeneous material.

According to the fourth aspect of the invention all resin combinations become thermo plastic at first temperature above ambient so that the resin flows affording the composition to the encapsulated and capable of consolidation into a shaped mass. The resin furthermore becoming thermosetting at a second temperature, so that the shaped and consolidating mass in organic or inorganic or combinations become rigid and irreversibly shaped.

According to the fifth aspect of the invention the modified resins (1–6) as employed are preferably in the form of water based dispersions in which hydrophilic ionic groups area attached to the polymer back bone. Such hydrophilic ionic centres function as internal emulsifying agents and the resin does not contain any free Isocyanate.

The process for manufacture of such colloidal urethane resins begins with reacting a polyether or polyester-diol with an excess of diisocyanate eventually in the presence of a small amount of solvents. By selecting proper polyol/diisocyanate ratio's, a lower molecular weight, high solids prepolymer is thus prepared. In addition, carboxylic acid functionally is reacted into the backbone by using an acid diol or dihydroxy acid.

After neutralising the acid groups with a basic material such a tertiary amine, the prepolymer is added to water under agitation, forms an emulsion, and is further extended with e.g. a diamine. The resulting urethane dispersions can be classified as colloidal due to their fine particle size (less than 0.1 micron) when the concentration of ionic or hydrophilic groups in the polymer backbone allows the achievement of small particles.

Whilst the resin is in dry form with no increase in temperature beyond pre-determined limits the resin remains thermoplastic, but when heated beyond a pre-determined temperature the resin quickly becomes thermoset.

During the curing of such urethane dispersions there probably occurs a certain physical cross linking caused by:
  elecrostatic forces between hydrophillic groups (Colombo forces).
  hydrogen bonding between urethane groups.
  interaction between hydrophobic segments of the chain (association).

The physical cross linking is partly responsible for the excellent properties of the cured material. Further resistance improvement is achievable by using additional cross linkers of which the polyfunctional aziridines are most commonly used.

The ionic nature of the backbone also allows the use of other cross linking systems such as melamines, expoxies etc.

We further can use an improved method of binding by using acrylic-polyuerthane dispersion.

To obtain a storage stable acrylic-polyurethane dispersion, the emulsification and/or dispering mechanism of both polymers must be compatible within the desired pH-range, usually between 7 and 8. The most simple combination is physical blend.

In general, these coatings have an improved stain and abrasion resistance. This technology can be applied to produce one-component, low VOC, storage stable, self-crosslinking adhesives and resins.

An aqueous dispersion of such modified urethane and/or acrylic resin can be added to organic and inorganic matter and combinations, so as to envelope each individual particle and produce a flowable composition which can be fed into various forms of moulding and extrusion apparatus.

It is according to the sixth aspect of invention, aqueous dispersion resin of compositions as listed in conjunction with particle modelling for fractionation of composite organic and inorganic materials to precise limits is essential for flowable composition.

During the passage of the composition through such equipment its temperature can be maintained within the range in which it remains thermoplastic, there by improving its flowability, until the material reaches the designed degree of compression and shape for the article to be produced, whereupon the temperature can be increased to such a level at which the composition becomes thermosetting and held at that temperature until substantially fully cured.

It is according to the seventh aspect of the invention that further enhancement can be achieved by the use of water repellents synthesised with resin structure, this giving month on month stability to the end product/s and giving such a product/s engineered hydrophillic and/or hydrophobic properties suitably enhancing range of end product uses, enhancing performance possibilities of empirical attachment or stand alone repellent materials can be utilised.

Combinations include but not confined to:

Hydroxyl Siloxane combinations as preparations.
Hydrogen Siloxane combinations as preparations.
Amino Functional Siloxane combinations as preparations.

All with compatability to resin pack with CPUs 50–2000 in combinations as synthesised liquids and emulsions with and without additional dilution characteristics, as well as dispersions and 100% liquid solids.

The organic and inorganic materials comprise waste residues of materials as listed the materials can be used damp or dry.

Tests have established that particles need not be separated to produce a quality product.

To obtain a storage stable acrylic-polyurethane dispersion, the emulsification and/or dispersing mechanism of both polymers must be compatible within the desired pH-range, usually between 7 and 8. The most simple combination is a physical blend, as used today in the coating industry. To obtain an acceptable level of solvent resistance (e.g. ethanol) the use of an external crosslinker is necessary.

When both polymers consist of a crosslinked network, an Interpenetrating Network (IPN) is formed; the chains of one polymer are completely entangled with those of the other polymer. Such IPN's are more stable than physical blends because they show less phase separation.

A more complicated approach involves the chain extension of the polyurethane in the presence of an acrylic resin, or even the reverse; emulsion polymerization of acrylic monomers in the presence of a polyurethane. This results in a new hybrid system with an increased solids content since one polymer is diluting the other while it is being synthesised.

Recently, much attention has been focused on the development of aqueous polyurethane and acrylic copolymers because of their improved computability, weatherability and film forming behaviour. However this copolymer technology cannot reach the same performance level as fully crosslinked systems.

In order to take advantage of the respective physical and chemical properties of acrylics and polyurethane's, and at the same time overcome their specific drawbacks, both polymeric structure can be combined into one single, self-crosslinking composition. In such hybrid systems the acrylic portion of the polymer imparts hardness and good ageing properties into the coating, the polyurethane portion brings enhanced film forming characteristics, elasticity and abrasion resistance. These new hybrid systems are storage stable; crosslinking only takes place during the coalescing phase in a drying film, and reaches the maximum crosslink density after 3 days at 20 C. or indeed decreased time of crosslinking is possible with increase temperatures, i.e. between about 60 C. and 300 C. Increased solvent and water resistance occurs after water evaporation as a result of interfacial crosslinking through built-in functional groups located on the surface of the polyurethane particle, and propriety reactive groups copolymerized into the acrylic backbone and which are buried into the core of the acrylic phase. This explains the stability of the acrylic-polyurethane dispersion.

Although the crosslinking mechanism is not yet fully assessed it may be assumed that the reaction is made possible due to a molecular interdiffusion process. This mechanism of formation of a cohesive film via interdiffusion of polymer chains across the original boundaries has been recognised as a basic concept for mechanical strength of films made from emulsions.

Evidence for the self-crosslinking can be found in the improved solvent resistance and increased gel content, the increased softening temperature and the appearance of a single Tg.

According to the eigth aspect of the invention curing is rapid and its possibilities to mould and shape a board 8'×4'(feet) and weighing 40 kilograms in under 120 seconds, typically 90 seconds. The shaping in both organic and inorganic materials being carried out at temperatures in the range of 70*C. to 90*C. and the thermosetting at temperatures above 120*C., whilst flat faced sheets or boards in organic or inorganic materials can of course be formed from the materials to produce a density water proof board with pigments fire proofing agents, and resin forcement such as carbon fibre, included in the composition is also suitable for forming by moulding into complex shapes or by extrusion into continuous lengths of complex cross section.

It is particularly to be noted that the composition after initial compression at said first temperature, forms an immediate material and that it can be stored and transported in a safer manner and without the restraints of wood. Again in the same way that for example lengths of timber can be shaped by appropriate machine operations as and when required.

Intermediate material can also be shaped as and when required by subjecting it firstly to heat such as to raise its temperature again into a range at which it becomes flowable, applying pressure to form it into the desired shape whilst at such temperature, and finally raising the temperature to cause thermosetting to occur in both organic and inorganic materials and in combination of both.

According to the ninth aspect the invention also resides in a mouldable article formed from organic or inorganic or combination materials which has been compressed and shaped at said first temperature to form a storable rigid product.

The mouldable article may take many forms. In one case the article may comprise a flat panel or board, such panel or board in thickness 2.5 mm to 40 mm can then be embossed on one or more surfaces for example to produce door profiles or wood grain, or with various decorative figures. Alternatively the panel or board can be reshaped, for example to a curved form, with or without surface moulding or embossing. After such operations carried out at said first temperature, the temperature is raised to cause the material to thermoset so as to form a rigid shaped product, which may for example compromise a decorative door panel, an architectural moulding, a skirting board, and architrave etc. Fittings such as hinges, handles and the like can be incorporated during the shipping process and be screened directly into composite meeting DSTM requiremnts, so as to become firmly bonded during thermosetting of the material.

In another case the mouldable article may be formed as a solid or hollow bar or rod which can subsequently be shipped by extrusion to form a shaped beam, column or the like.

In a further case the mouldable article may be formed as a block or a brick, or a brick which can subsequently be shaped by standing or the like to form a shaped solid body.

It will be recognised that conventional pre-constituted materials cannot be processed in this way.

Alternatively, of course, the composition in accordance with the invention in organic or inorganic or combination materials, can be formed into a finished article directly without being formed into a storable intermediate article and again sawdust organic/inorganic materials can be stored in silos or stored in covered areas for multi purpose usage.

The whole of the invention in finished flat and finished mouldable products meets and surpasses requirements of

BS 5669

BS 1142

JISA 5908 For stability.

and BS 5669

BS 1142

JISA 5908 For internal bond strength (IBS) in all climatic conditions.

In respect to internal bond strength before climatic conditioning, IBS can be engineered with finished tensile strength from 0.4 MPa–4.5 MPa for each thickness 2.5 mm–40 mm and after climatic conditioning i.e. boiling and cyclic testing for 2 hours duration over 24 hour period, maintain 92–98% of properties and strength characteristics following further bond strength testing. With water repellence the same results apply with the additional or controlled water ingress per mm over 24 hours to maximum engineered ingress per board per thickness.

Fire Testing

The board from 2.5 mm to 40 mm thick will meet BS476—parts 20–22.

Surface Spread of Flame

Standard boards can have class 3 surface spread of flame as BS476 part 7 1987.

Effect of relative humidity change from 65% to 85%.

Increase in length—less than 0.1%

Increase in thickness—less than 2%

Water

Homogeneous board is suitable for internal and external use in areas with prolonged wetting exposure.

Insect Attack

Infestation proof temperate climates

Infestation proof tropical climates. Under test.

Fungal Resistance

Will not rot or be attacked by wet rot fungi under prolonged conditions

Working Characteristics—Health and Safety

Homogeneous particle board can be cut by hand or power saw and machine (routed, spindled, planed and bored, on edge,) with normal woodworking machinery. Tungsten carbide tipped tools are recommended for use with powered tools.

Ecoboard will generate dust when machined.

Regulation 7 of the control of substances hazardous to health regulations (COSHH), requires that exposure to dust is either prevented or, if this is not realistically practicable, adequately controlled. The current occupational exposure standard for softwood dust would apply in all cases where lignocellulosic products are used as basic starter material, 5 mg/ $m_3$, expressed as an eight hour time waited average. Hard wood dust as applied is listed in Schedule 1 of COSHH, and is therefore a maximum exposure limit. The value for hardwood dust is also 5 mg/$m_3$.

Advance Enterprises Limited recommends that dust extraction equipment to meet COSHH, be installed and adequately maintained along with dust masks and safety glasses all should be used when working with any lignocellulosic based material.

For further data see Health and Safety executive information sheet (selection of respiratory protective equipment suitable for use with wood dust. Woodworking sheet 14). For other materials please consult Advance Enterprises Limited.

Formaldehyde/Phenol Content

Advance Enterprises recognises wood contains a minute amount of formaldehyde but also states that no formaldehyde release whatsoever is experienced using the AEL products whether looking for formaldehyde or phenol. No leaching of residues throughout the whole of climatic testing. Effluent is European domestic grade.

Application

Flat board products

Moulded products

Extruded products

All product are for use in external and internal conditions ie. doors, window frames, soffits, floors, roofs, barge boards, flooring, LD & HD. The Ecoboard product is multi purpose in its use and can be reduced for all applications where polymeric materials are used today and can go a long way to replace metallic veneers and high grade polymer applications.

Advance Enterprises Limited Ecoboard is the new multi-purpose polymeric material for the nineties and beyond.

Size

Board sizes 2400 mm×1200 mm, combination cutting to order a possibility.

Weight

Typical densities 630, 650, 690, 720, Kg/m$_3$ giving board weight at 16 mm of approximately 20/33 Kilos.

Climatic Effect

Ecoboard is not hygroscepic and its dimensions do not change above 4% after testing in two hour cycles at 95% RH at 95*c. Enginereed property retention—100%, as required. Material becomes polymeric in nature.

Behaviour in Use

Quality levels given below, should be used for reference and design purposes. Specific values can be engineered for specific products to customer request by simple manufacturing menu adjustment.

| Strength Properties | | | | | |
|---|---|---|---|---|---|
| Board Thickness | | up to 19<br>up to 19 | 20–25<br>20–25 | 26–32<br>26–32 | 33–40<br>33–40 |
| Tensile strength perpendicular to the plane of the board Ambient. | (MPa) | 0.4–4.5 | 0.4–4.2 | 0.4–4.2 | 0.4–4.2 |
| Tensile strength Perpendicular to the plane of the board after V100 cyclic test 65–95% RH 95% | (MPa) | 0.2–4.27 | 0.2–3.99 | 0.2–3.99 | 0.12–3.99 |
| Modulus of elasticity perpendicular to the plane of the board. | (MPa) | 3700 | 3000–3700 | 3000–3700 | 3000–3700 |
| Tensile strength parallel to plane of the board. | (MPa) | 9–11 | 8–11 | 8–11 | 8–11 |

ECOBOARD

THICKNESS (mm) 3 6 8.0 9.0 10 12 16 18 20 25 30 35 40

| Engineered Board Density,KG/m$_3$ | Applications Internal/External |
|---|---|
| 530–650 | Pin Boards, Notice Boards, Wall Linings, Sheathing, Partitions, Panelling, Ceilings, Floor Underlays, Shpfitting, Display Units, |
| Signboards Core stick. Plastic | Chalkboards, |
| 630–930 | Laminate, Insulation Boards Exterior Claddings Soffits Fascias. |
| 720 | Partitions, Doors, Window Frames, Anti-drum linings |
| for | metal partitions, Machine Casings, Flooring, |
| Underlays, Underlays, | Ground Floor Floating Floors. |
| 720 | Furniture Cabinet use, Draws, Doors, Unit tops, Profiled |
| Edge, | Relief Surfaces, One piece framing, Shuttering, Replacement for |
| solid timber, | Shopfitting, Partitions, |
| Laytex | Carriers, Skirting, Window Boards, Architrave's, |
| Cornice | and Mouldings. |
| 720 | Joinery components Stair treads, Landings, Business signs, Shop Fronts. Exterior Displays, Marine Craft, Interiors. |
| 900 (3 mm) | Interior, Linings |

All density and thickness Interior/Exterior use. Totally stable material in expansion, linear and perpendicular. Stable DN V100 Cyclic boil test to DN or BS 1142/5669 and engineered properties retention from 50% to 98% and in certain cases 100% property retention is available.

TESTING OF FINISHED PRODUCT

THE FOLLOWING MOULDED COMPOSITE MATERIAL/S PRESSED MATERIAL TESTING WAS CARRIED OUT ON AN INSTRON 4467 1X WITH WINDOWS SOFTWARE AND IRE-488 COMPUTER INTERFACE

TYPICAL INNER BOND STRENGTH FOR MOULDED COMPOSITION BOARDS—(IBS)

ADVANCE ENTERPRISES
ADINI HOUSE
CANNOCK

| Operator name: | A BANKS | Ecoboard Tensile | |
|---|---|---|---|
| Sample Identification: | I B 600 | Test Date: | 06 May 1996 |
| Test Method Number: | 10 | Interface Type: | 4200 |
| ECOBOARD | | Crosshead Speed: | 1.0000 mm/min |
| | | Sample Rate (pts/secs): | 10.0000 |
| | | Temperature: | 20 C. |
| | | Humidity (%): | 50 |
| | | Grip Distance: | 100.0000 mm |
| | | Specimen G.L.: | 200.0000 mm |

HARDWOOD SAWDUST 824 kg/m3 INTERNAL BOND STRENGTH TEST

| | Displement at Max.Load (mm) | Load at Max.Load (kN) | Stress at Max.Load (MPa) | Strain at Max.Load (mm/mm) | % Strain at Max.Load (%) | Nm % Strain at Max.Load (%) | Modulus (Aut Young) (MPa) |
|---|---|---|---|---|---|---|---|
| 1 | 1.030 | 1.726 | 3.634 | 0.005 | 0.515 | 0.515 | 862.151 |
| 2 | 0.780 | 1.560 | 3.284 | 0.004 | 0.390 | 0.390 | 1076.335 |
| 3 | 0.730 | 1.588 | 3.343 | 0.004 | 0.365 | 0.365 | 1105.356 |
| Mean | 0.847 | 1.625 | 3.420 | 0.004 | 0.423 | 0.423 | 1014.614 |
| S.D. | 0.161 | 0.089 | 0.187 | 0.001 | 0.080 | 0.080 | 132.831 |

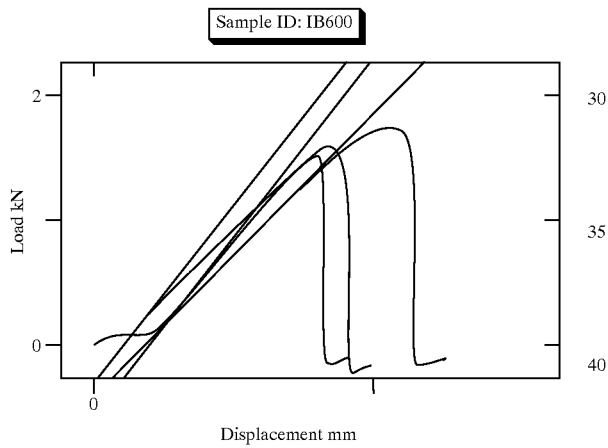

ADVANCE ENTERPRISES
ADINI HOUSE
CANNOCK

| Operator name: | A BANKS | Ecoboard Tensile | |
|---|---|---|---|
| Sample Identification: | I B 157 | Test Date: | 03 May 1996 |
| Test Method Number: | 10 | Interface Type: | 4200 |
| ECOBOARD | | Crosshead Speed: | 1.0000 mm/min |
| | | Sample Rate (pts/secs): | 10.0000 |
| | | Temperature: | 20 C. |
| | | Humidity (%): | 50 |
| | | Grip Distance: | 100.0000 mm |
| | | Specimen G.L.: | 200.0000 mm |

| | Displement at Max.Load (mm) | Load at Max.Load (kN) | Stress at Max.Load (MPa) | Strain at Max.Load (mm/mm) | % Strain at Max.Load (%) | Nm % Strain at Max.Load (%) | Modulus (Aut Young) (MPa) |
|---|---|---|---|---|---|---|---|
| 1 | 0.220 | 0.457 | 0.961 | 0.001 | 0.110 | 0.110 | 1292.139 |
| 2 | 0.260 | 0.654 | 1.376 | 0.001 | 0.130 | 0.130 | 1484.857 |
| 3 | 0.360 | 0.609 | 1.282 | 0.002 | 0.180 | 0.180 | 1174.887 |

-continued

| | | ADVANCE ENTERPRISES ADINI HOUSE CANNOCK | | | | | |
|---|---|---|---|---|---|---|---|
| Mean | 0.280 | 0.573 | 1.206 | 0.001 | 0.140 | 0.140 | 1317.294 |
| S.D. | 0.072 | 0.103 | 0.218 | 0.000 | 0.036 | 0.036 | 156.509 |

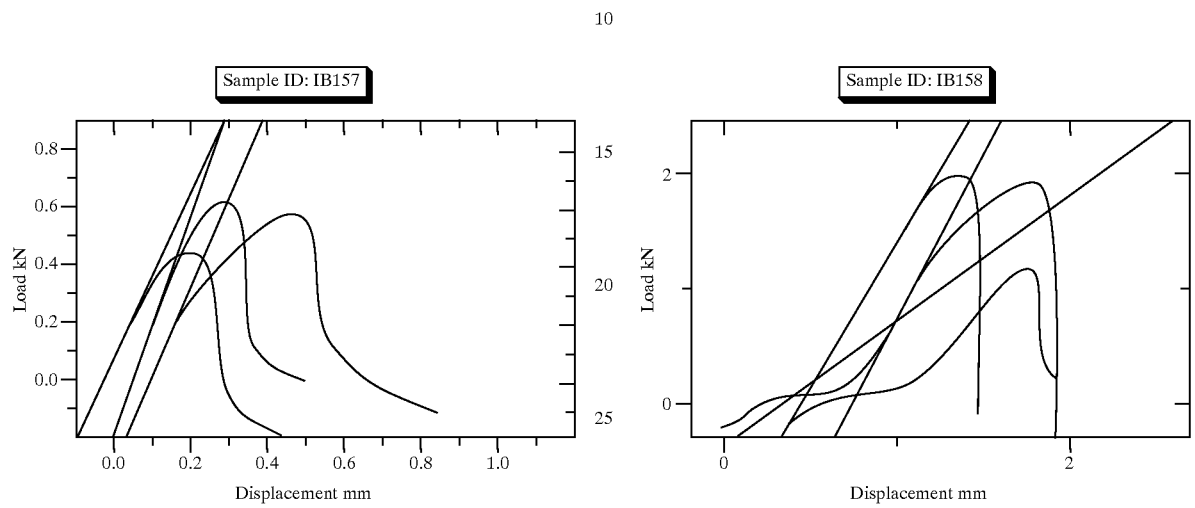

| ADVANCE ENTERPRISES ADINI HOUSE CANNOCK | | | | | | | |
|---|---|---|---|---|---|---|---|
| Operator name: | | A BANKS | Ecoboard Tensile | | | | |
| Sample Identification: | | I B 158 | Test Date: | | 05 May 1996 | | |
| Test Method Number: | | 10 | Interface Type: | | 4200 | | |
| ECOBOARD | | | Crosshead Speed: | | 1.0000 mm/min | | |
| | | | Sample Rate (pts/secs): | | 10.0000 | | |
| | | | Temperature: | | 20 C. | | |
| | | | Humidity (%): | | 50 | | |
| | | | Grip Distance: | | 100.0000 mm | | |
| | | | Specimen G.L.: | | 200.0000 mm | | |
| Hardwood Sawdust 807 kg/m3 Resin Pack 10% | | | | | | | |
| | Displement at Max.Load (mm) | Load at Max.Load (kN) | Stress at Max.Load (MPa) | Strain at Max.Load (mm/mm) | % Strain at Max.Load (%) | Nm % Strain at Max.Load (%) | Modulus (Aut Young) (MPa) |
| 1 | 1.800 | 2.091 | 4.402 | 0.009 | 0.900 | 0.900 | 1002.738 |
| 2 | 1.240 | 2.009 | 4.229 | 0.006 | 0.620 | 0.620 | 911.027 |
| 3 | 1.46 | 1.425 | 1.000 | 0.007 | 0.730 | 0.730 | 476.967 |
| Mean | 1.500 | 1.842 | 3.877 | 0.007 | 0.750 | 0.750 | 796.911 |
| S.D. | 0.282 | 0.363 | 0.765 | 0.001 | 0.141 | 0.141 | 280.848 |

ADVANCE ENTERPRISES
ADINI HOUSE
CANNOCK

| Operator name: | A BANKS | Ecoboard Tensile | |
|---|---|---|---|
| Sample Identification: | I B 159 | Test Date: | 05 May 1996 |
| Test Method Number: | 10 | Interface Type: | 4200 |
| ECOBOARD | | Crosshead Speed: | 1.0000 mm/min |
| | | Sample Rate (pts/secs): | 10.0000 |
| | | Temperature: | 20 C. |
| | | Humidity (%): | 50 |
| | | Grip Distance: | 100.0000 mm |
| | | Specimen G.L.: | 200.0000 mm |

Hardwood Sawdust 105 resin-105prosil

| | Displement at Max.Load (mm) | Load at Max.Load (kN) | Stress at Max.Load (MPa) | Strain at Max.Load (mm/mm) | % Strain at Max.Load (%) | Nm % Strain at Max.Load (%) | Modulus (Aut Young) (MPa) |
|---|---|---|---|---|---|---|---|
| 1 | 0.630 | 1.439 | 3.029 | 0.003 | 0.315 | 0.315 | 1227.862 |
| 2 | 1.250 | 1.555 | 3.274 | 0.006 | 0.625 | 0.625 | 996.375 |
| 3 | 1.310 | 1.495 | 3.147 | 0.007 | 0.655 | 0.655 | 873.988 |
| Mean | 1.663 | 1.496 | 3.150 | 0.005 | 0.532 | 0.532 | 1032.742 |
| S.D. | 6.376 | 0.058 | 0.122 | 0.002 | 0.188 | 0.188 | 179.718 |

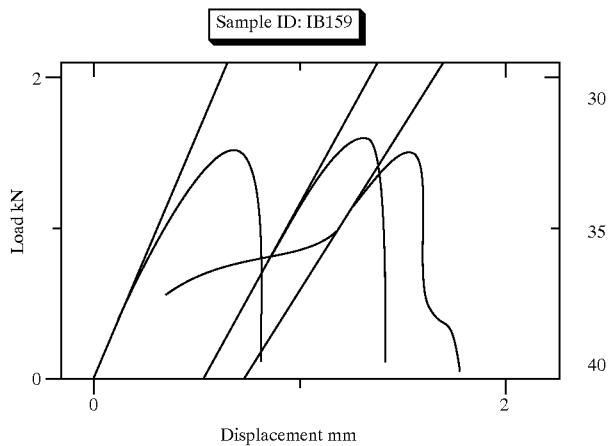

ADVANCE ENTERPRISES
ADINI HOUSE
CANNOCK

| Operator name: | A BANKS | Ecoboard Tensile | |
|---|---|---|---|
| Sample Identification: | I B 1000 | Test Date: | 04 May 1996 |
| Test Method Number: | 10 | Interface Type: | 4200 |
| ECOBOARD | | Crosshead Speed: | 1.0000 mm/min |
| | | Sample Rate (pts/secs): | 10.0000 |
| | | Temperature: | 20 C. |
| | | Humidity (%): | 50 |
| | | Grip Distance: | 100.0000 mm |
| | | Specimen G.L.: | 200.0000 mm |

Salicornia 807 KG/M3 INTERNAL BOND TEST

| | Displement at Max.Load (mm) | Load at Max.Load (kN) | Stress at Max.Load (MPa) | Strain at Max.Load (mm/mm) | % Strain at Max.Load | Nm % Strain at Max.Load (%) | Modulus (Aut Young) (MPa) |
|---|---|---|---|---|---|---|---|

-continued

ADVANCE ENTERPRISES
ADINI HOUSE
CANNOCK

| | | | | | | | |
|---|---|---|---|---|---|---|---|
| 1 | 0.660 | 1.211 | 2.592 | 0.003 | 0.330 | 0.330 | 1404.486 |
| 2 | 0.660 | 1.100 | 2.316 | 0.003 | 0.330 | 0.330 | 987.529 |
| Mean | 0.660 | 1.165 | 2.454 | 0.003 | 0.330 | 0.330 | 1196.008 |
| S.D. | 0 | 0.093 | 0.195 | 0 | 0 | 0 | 294.833 |

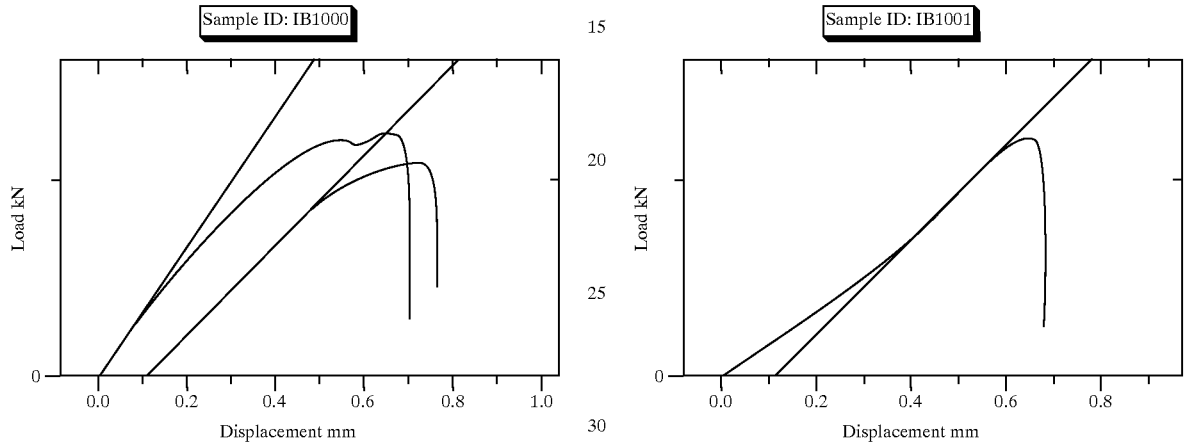

ADVANCE ENTERPRISES
ADINI HOUSE
CANNOCK

| Operator name: | A BANKS | Ecoboard Tensile | |
|---|---|---|---|
| Sample Identification: | I B 1001 | Test Date: | 04 May 1996 |
| Test Method Number: | 10 | Interface Type: | 4200 |
| ECOBOARD | | Crosshead Speed: | 1.0000 mm/min |
| | | Sample Rate (pts/secs): | 10.0000 |
| | | Temperature: | 20 C. |
| | | Humidity (%): | 50 |
| | | Grip Distance: | 100.0000 mm |
| | | Specimen G.L.: | 200.0000 mm | salicornia

| | Displement at Max.Load (mm) | Load at Max.Load (kN) | Stress at Max.Load (MPa) | Strain at Max.Load (mm/mm) | % Strain at Max.Load (%) | Nm % Strain at Max.Load (%) | Modulus (Aut Young) (MPa) |
|---|---|---|---|---|---|---|---|
| 1 | 0.650 | 1.188 | 2.640 | 0.003 | 0.325 | 0.325 | 1019.636 |
| Mean | 0.650 | 1.188 | 2.640 | 0.003 | 0.325 | 0.325 | 1019.636 |
| S.D. | 0 | 0 | 0 | 0 | 0 | 0 | 0 |

| ADVANCE ENTERPRISES ADINI HOUSE CANNOCK | | | | | | | |
|---|---|---|---|---|---|---|---|
| Operator name: | A BANKS | Ecoboard Tensile | | | | | |
| Sample Identification: | I B 1002 | Test Date: | | 04 May 1996 | | | |
| Test Method Number: | 10 | Interface Type: | | 4200 | | | |
| ECOBOARD | | Crosshead Speed: | | 1.0000 mm/min | | | |
| | | Sample Rate (pts/secs): | | 10.0000 | | | |
| | | Temperature: | | 20 C. | | | |
| | | Humidity (%): | | 50 | | | |
| | | Grip Distance: | | 100.0000 mm | | | |
| | | Specimen G.L.: | | 200.0000 mm | | | |
| hardwood dust | | | | | | | |
| | Displement at Max.Load (mm) | Load at Max.Load (kN) | Stress at Max.Load (MPa) | Strain at Max.Load (mm/mm) | % Strain at Max.Load (%) | Nm % Strain at Max.Load (%) | Modulus (Aut Young) (MPa) |
| 1 | 1.120 | 1.569 | 3.487 | 0.006 | 0.560 | 0.560 | 849.674 |
| Mean | 1.120 | 1.569 | 3.487 | 0.006 | 0.560 | 0.560 | 849.674 |
| S.D. | 0 | 0 | 0 | 0 | 0 | 0 | 0 |

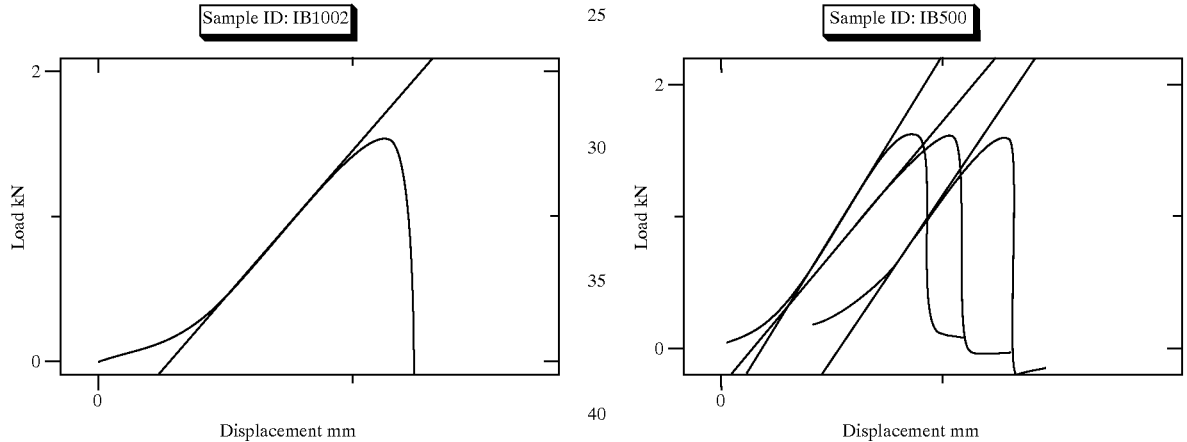

| ADVANCE ENTERPRISES ADINI HOUSE CANNOCK | | | | | | | |
|---|---|---|---|---|---|---|---|
| Operator name: | A BANKS | Ecoboard Tensile | | | | | |
| Sample Identification: | I B 500 | Test Date: | | 01 January 1996 | | | |
| Test Method Number: | 10 | Interface Type: | | 4200 | | | |
| ECOBOARD | | Crosshead Speed: | | 1.0000 mm/min | | | |
| | | Sample Rate (pts/secs): | | 10.0000 | | | |
| | | Temperature: | | 20 C. | | | |
| | | Humidity (%): | | 50 | | | |
| | | Grip Distance: | | 100.0000 mm | | | |
| | | Specimen G.L.: | | 200.0000 mm | | | |
| salicornia-22r-.-22 tris-as solid | | | | | | | |
| | Displement at Max.Load (mm) | Load at Max.Load (kN) | Stress at Max.Load (MPa) | Strain at Max.Load (mm/mm) | % Strain at Max.Load (%) | Nm % Strain at Max.Load (%) | Modulus (Aut Young) (MPa) |
| 1 | 1.070 | 1.638 | 3.276 | 0.005 | 0.535 | 0.535 | 781.747 |
| 2 | 1.210 | 1.619 | 3.238 | 0.006 | 0.605 | 0.605 | 970.759 |
| 3 | 0.776 | 1.620 | 3.240 | 0.004 | 0.385 | 0.385 | 1019.785 |
| Mean | 1.017 | 1.626 | 3.251 | 0.005 | 0.508 | 0.508 | 924.097 |
| S.D. | 0.225 | 0.011 | 0.021 | 0.001 | 0.112 | 0.112 | 125.692 |

BRIEF DESCRIPTION OF THE DRAWINGS

The present invention will be better understood by the following detailed descriptions of some preferred embodiments of the invention, taken in conjunction with the accompanying drawings, in which like reference numerals refer to like parts, and in which.

DESCRIPTION OF THE PREFERRED EMBODIMENTS

Figure 6:
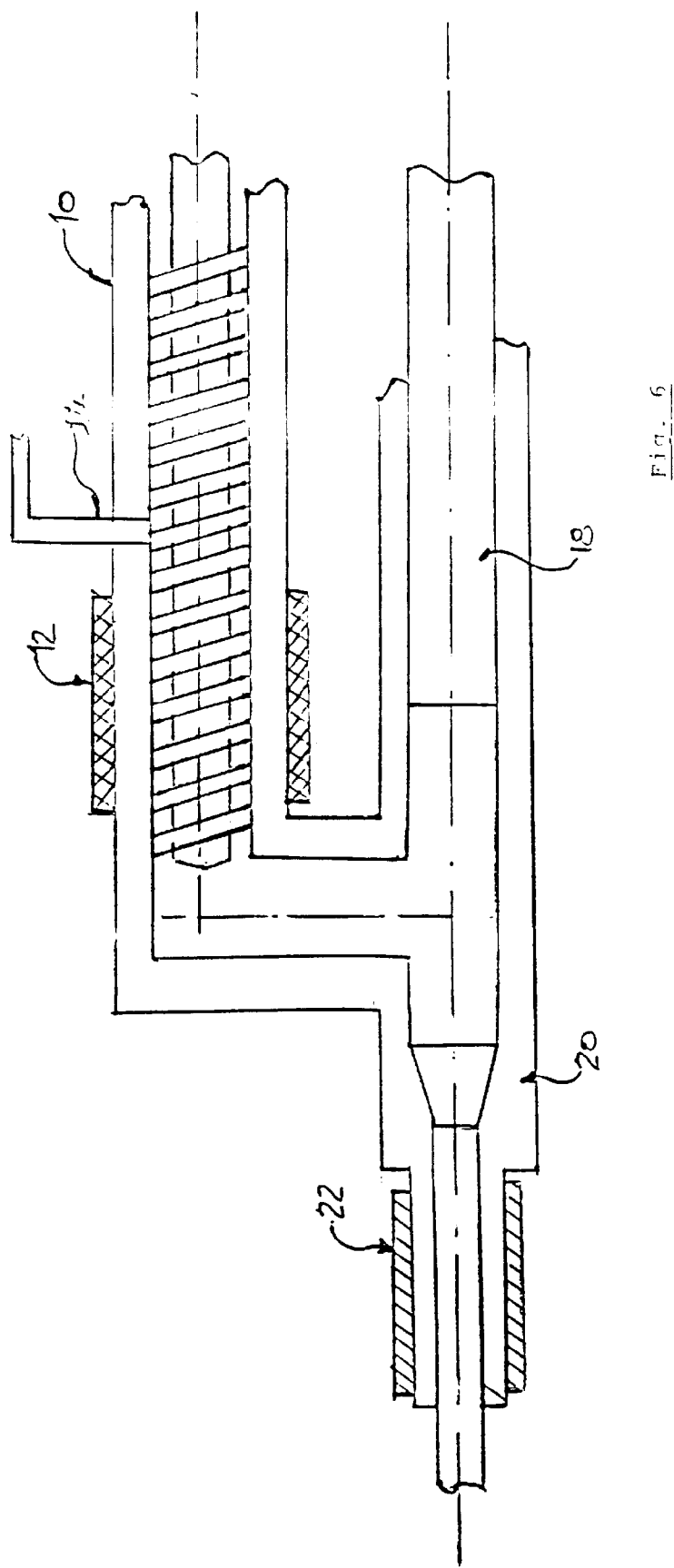
FIG. 6 is a cross-sectional view of a mixing and extrusion apparatus for producing a shaped end product according to one embodiment of the invention.
Figure 7:
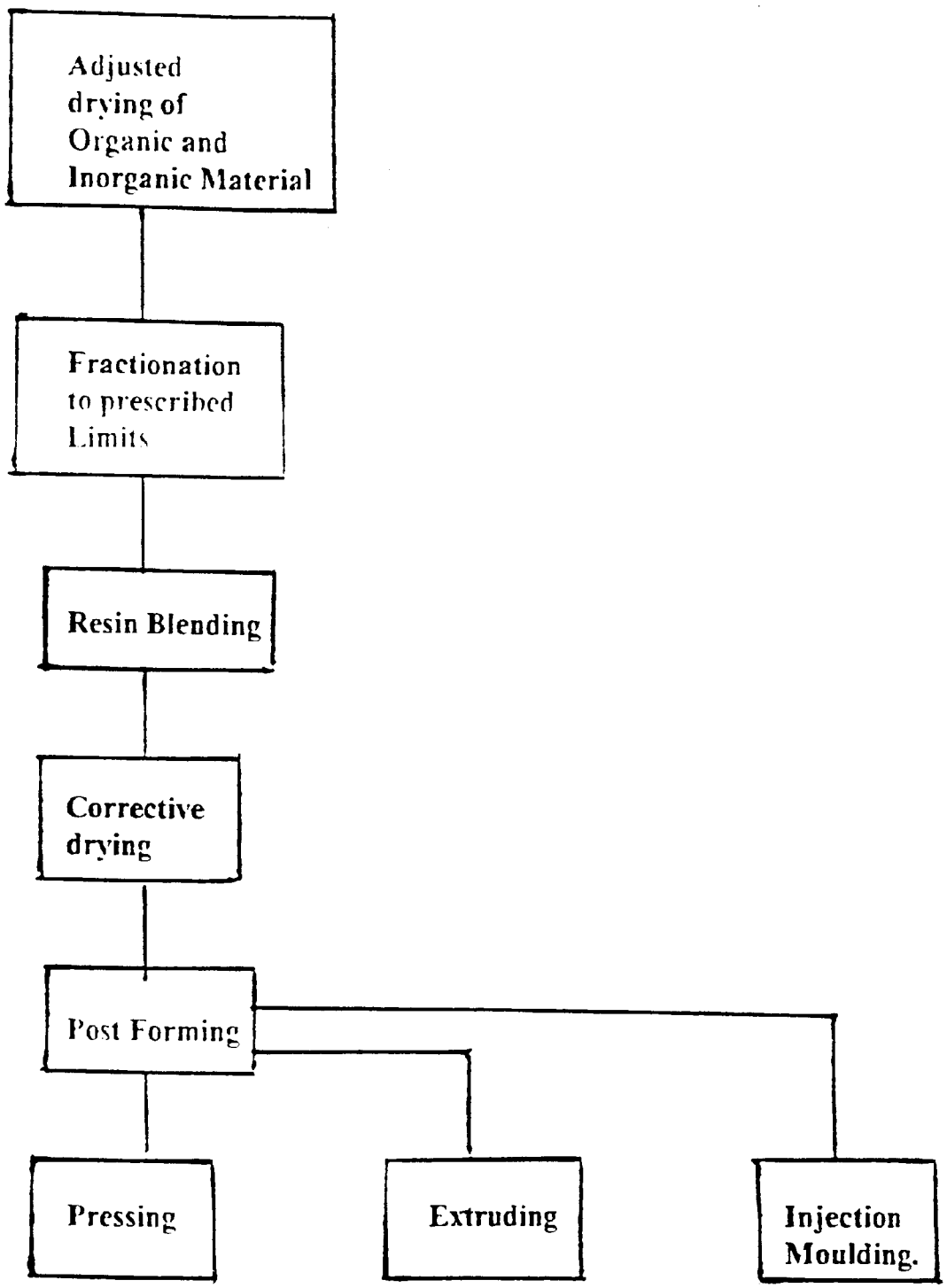
FIG. 7 is a flow diagram of the method of producing a shaped end product according to a preferred embodiment of the invention.

FIG. 7 is a flow diagram of the method steps in forming a shaped end product from waste materials according to a preferred embodiment of the invention. The organic or inorganic waste material is first dried (step 30) and then, optionally, fractionated (step 32). The particulate waste material is then mixed with a non-toxic resin material (step 34). The mixture is then dried (step 36) and formed into a desired shape (step 38). The shaping or forming may be by pressing (40), extruding (42), or injection molding (44), and some of these alternative shaping techniques are illustrated in FIGS. 1 to 6.

Figure 1:
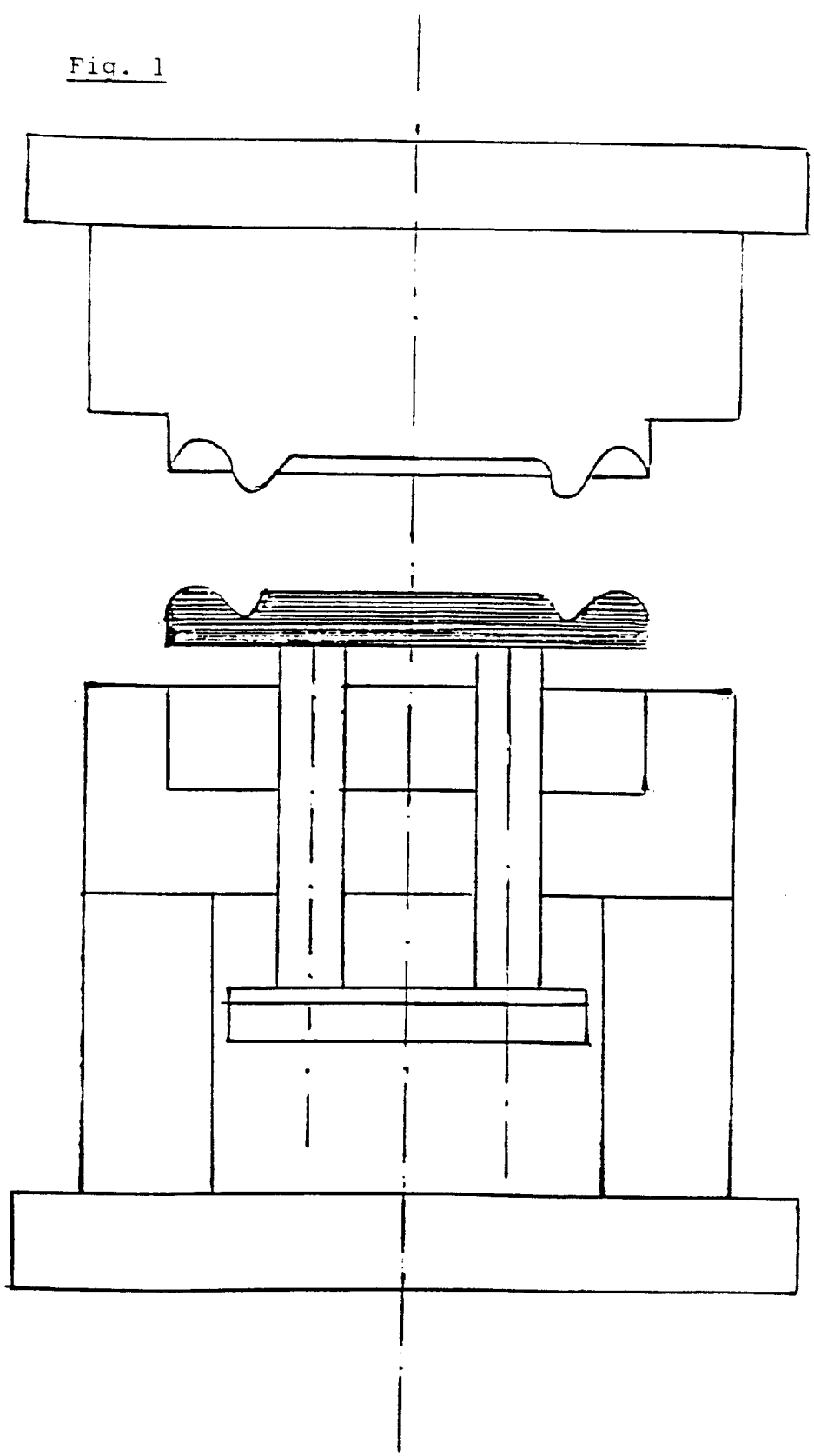
FIG. 1 is a side elevational view, partially in section, of a compression molding apparatus for shaping a mixture according to one embodiment of the invention into an exemplary shape.

FIG. 1 illustrates compression moulding in which the material 50, which is in a flat sheet form, is charged into the bottom die 52, and the top die 54 is then closed to impart the required shape to the material which is held at the required temperature for a predetermined cycle time, after which the press opens and the finished moulded component is ejected.

Figure 2:
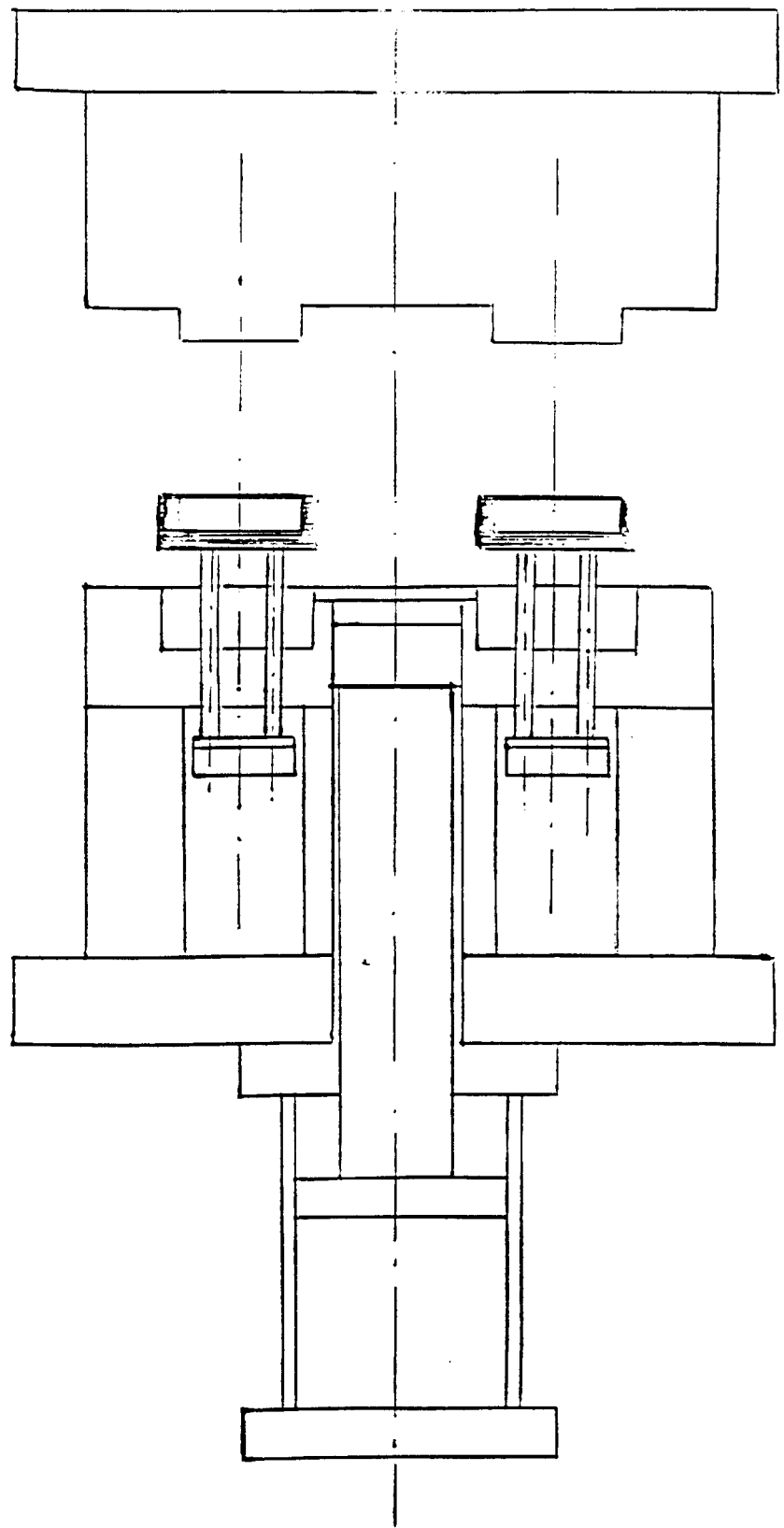
FIG. 2 is a side elevational view, partially in section, of an alternative, transfer molding process.

FIG. 2 illustrates transfer moulding carried out in a similar manner, in which the material 50 is shaped between bottom die 56 and top die 58.

Figure 3:
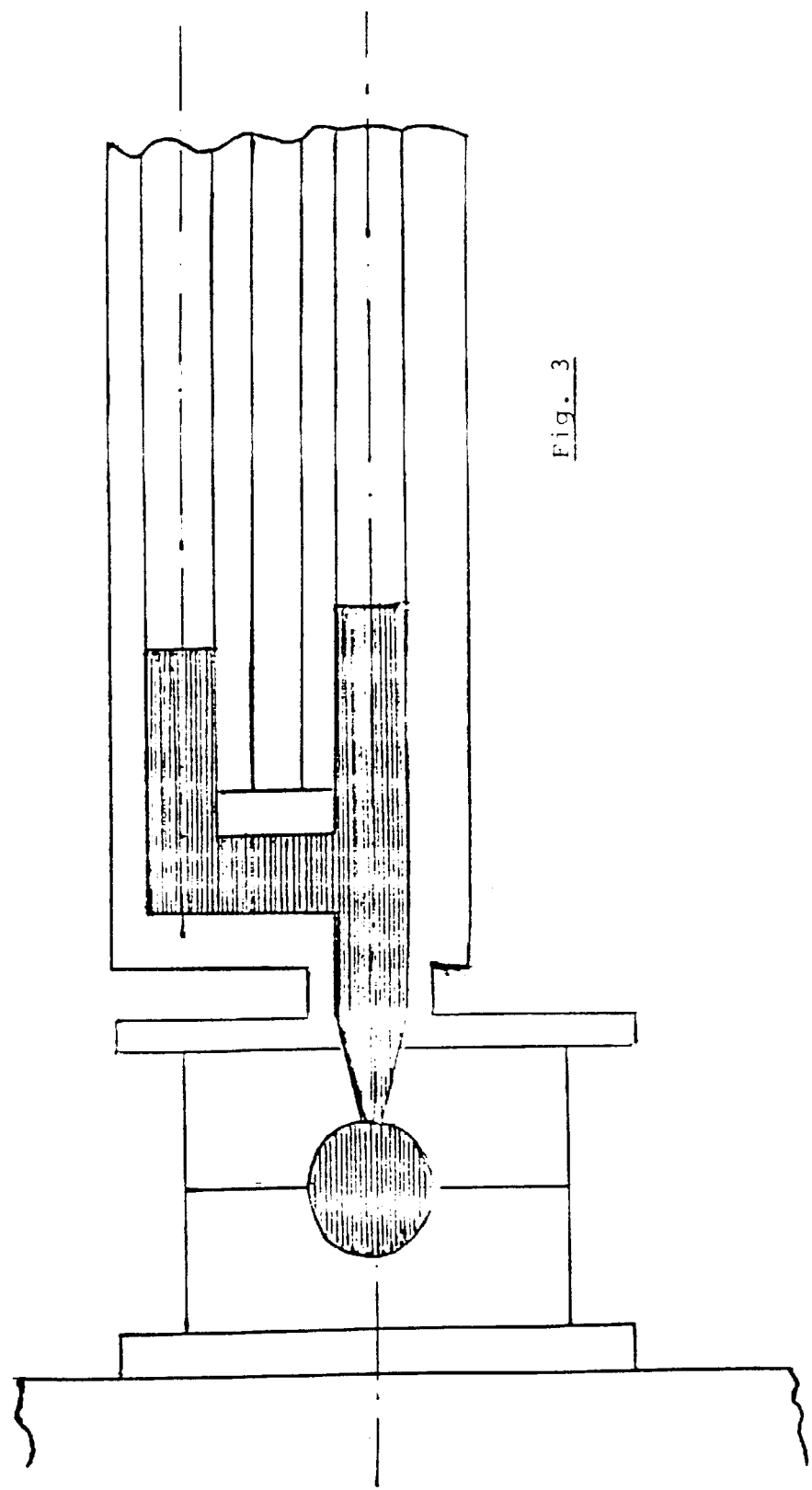
FIG. 3 is a side elevational view, partially in section, illustrating an injection molding apparatus.

FIG. 3 illustrates injection moulding, in which a flowable mixture 60 of waste material particles and resin is injected from injector 62 into die cavity 64.

Figure 4:
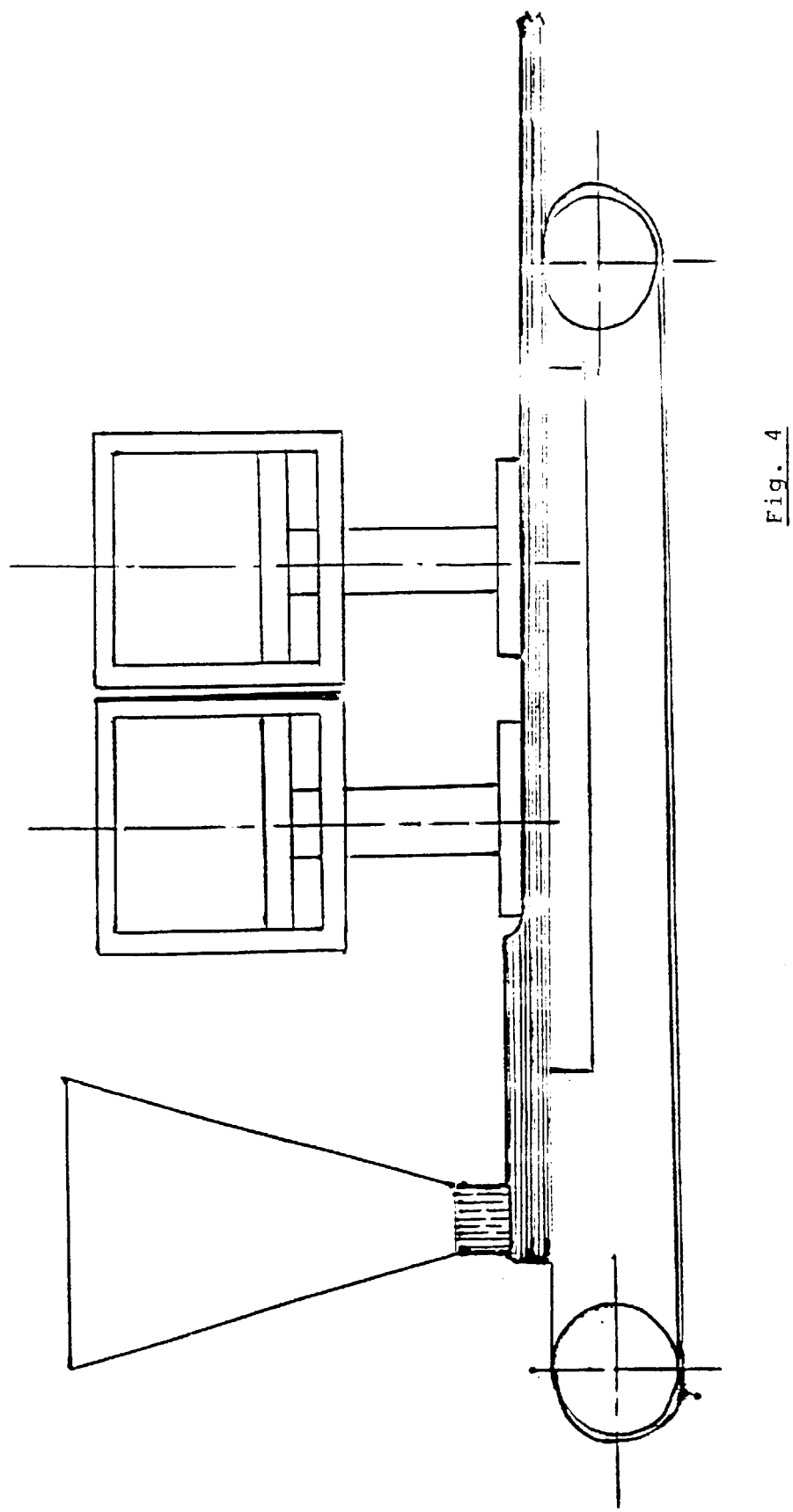
FIG. 4 is a side elevational view, partially in section, illustrating a conveyor press apparatus.

FIG. 4 illustrates a conveyor press in which the material 60 is fed onto a conveyor belt 65 from a hopper 66. The belt 65 advances intermittently, and while the belt is stationary, the material is compressed by a heated platen 68 to the required thickness and held under compression at the required temperature for the appropriate length of time for curing to occur.

Figure 5:
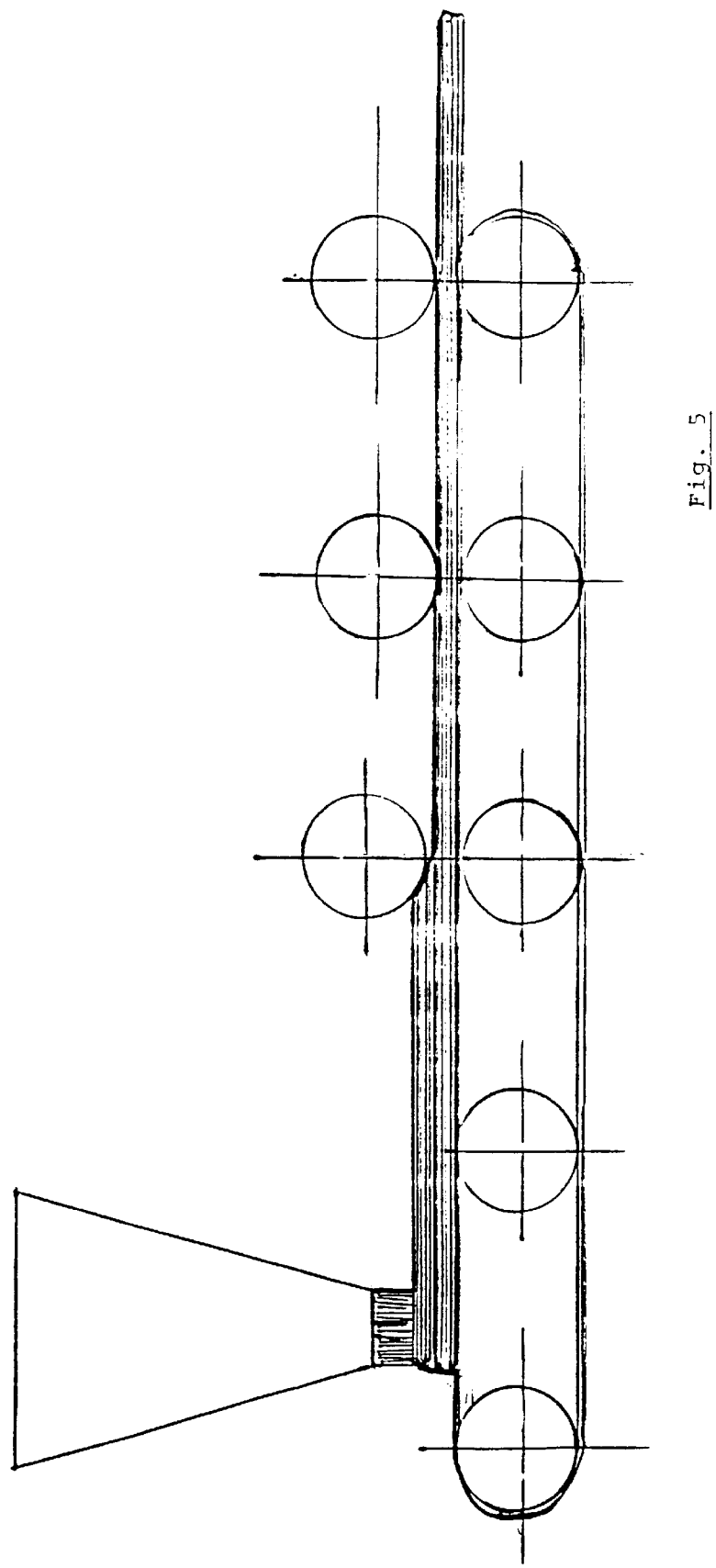
FIG. 5 is a side elevational view illustrating a conveyor belt, continuous extrusion apparatus.

FIG. 5 illustrates a process of continuous extrusion on a conveyor belt. In this case, the material 60 is delivered from a hopper 70 to a continuously advancing conveyor 72 and passes through a succession of heated rollers. Alternatively, or additionally heat may be applied to the material in any appropriate manner between the rollers 74. The final roller may be embossed to provide any appropriate pattern on the finished material, for example simulated wood grain.

FIG. 6 illustrates an extrusion process to produce a continuous length of solid material of any required cross-sectional shape. FIG. 6 illustrates a method and apparatus for producing a shaped end product from raw waste materials according to a preferred embodiment of the invention.

The raw material, i.e. waste vegetable matter together with any fillers, extenders, fireproofing agents and pigments is advanced along an inlet of mixing chamber 10 and into and through a first heating section 12. The resin dispersion is introduced at 14, upstream of the heating section 12, and mixed with the incoming material in the heating section whilst the resin is in a thermoplastic condition. The thermoplastic material then passes into a compression section 16 from it is displaced by means of a piston 18 through a forming die 20 into a heating outlet area 22 at which the temperature of the material is raised so that it becomes thermosetting. The length of the heated area 22 is such that the time required for the passage of the material through the area is sufficient for the material to thermoset.

It is to be noted that the necessary heating of resin can be carried out in various ways including induction heating high frequency, microwave or infra-red heating or by the application of ultrasonic energy, as well as electrical resistance heating.

The features disclosed in the foregoing description, or in the accompanying drawing, expressed in their specific forms or in terms of a means for performing the disclosed function, or a method or process for attaining the disclosed result, may, separately or in any combination of such features, be utilised for realising the invention in diverse forms thereof.

These coatings have improved stain and abrasion resistance.

The technology can be applied to produce one component, low VOC, storage stable, self-crosslinking adhesives and resins.

What is claimed is:

1. A method of producing a rigid, shaped product comprising the steps of:

introducing organic or inorganic solid particulate material into a mixing chamber;

introducing a non-toxic resin material comprising an aqueous dispersion of a blend of acrylic and polyurethane resins which forms a self-crosslinking composition into the mixing chamber at a first temperature at which the resin material is thermoplastic;

mixing the thermoplastic resin material and particulate material together to form a flowable mixture;

forming the flowable mixture by pressing, molding or extruding into a predetermined shape; and curing the shaped mixture to thermoset the resin material and form a rigid, shaped product having a density in the range of 530–900 kg/m$^3$, a tensile strength perpendicular to the principal plane of the product in the range of 0.2–4.2 MPa, a tensile strength parallel to the principal plane of the product in the range of 8–11 MPa, and a modulus of elasticity perpendicular to the principal plane of the product in the range of 3000–3700 MPa.

2. The method as claimed in claim 1, in which the solid particulate material is selected from the group consisting of: waste products comprising hard wood dust; rubber wood; softwood flakes; hemp fiber dust; semphire; salicornia; bagasse; rice husk; ground rice; palm frond material; palm trunk material; paper; cloth; slate dust; ceramic dust; pottery waste; dune sand; sea shore sand; quarry waste; and limestone.

3. The method as claimed in claim 1, wherein the resin material is a fully reacted, high molecular weight polyurethane resin.

4. The method as claimed in claim 1, wherein the resin material is in the form of a water based dispersion in which hydrophilic ion groups are attached to a polymer backbone of the resin material.

5. The method as claimed in claim 1, including the step of associating a water repellant material with the resin material prior to introduction into the mixing chamber.

6. The method as claimed in claim 1, wherein the water repellant material is selected from the group consisting of: hydroxyl siloxanes, hydrogen siloxanes, amino functional siloxanes, and combinations thereof.

7. The method as claimed in claim 1, wherein the resin material is a colloidal urethane resin.

8. The method as claimed in claim 1, wherein the mixture is cured for a time period which is not greater than 120 seconds.

9. The method as claimed in claim 1, wherein the first temperature is in the range from 70° C. to 90° C.

10. The method as claimed in claim 1, wherein curing is carried out at a second temperature which is greater than 120° C.

11. The method as claimed in claim 1, wherein the forming step comprises shaping the mixture into a flat panel having a thickness in the range from 2.5 mm. to 40 mm.

12. The method as claimed in claim 1, wherein the resin material is a dry blend of acrylic and polyurethane resins forming a self-crosslinking composition.

13. The method as claimed in claim 1, wherein the resins are in the form of a water based dispersion in which hydrophilic ion groups are attached to a polymer backbone of the resins.

14. A rigid, shaped product formed according to the method of claim 1.

15. A rigid, shaped product as in claim 14 in board form comprising construction board, chipboard, water resistant board, fire resistant board, a door, window frame, soffit, floor, roof, barge board, moulding, bar, rod, column, beam, brick or the like.

* * * * *